United States Patent [19]
Kurtzman, Jr.

[11] 4,333,757
[45] Jun. 8, 1982

[54] MUSHROOM-GROWING MEDIUM

[75] Inventor: Ralph H. Kurtzman, Jr., Berkeley, Calif.

[73] Assignee: The United States of America as represented by the Secretary of Agriculture, Washington, D.C.

[21] Appl. No.: 132,597

[22] Filed: Mar. 21, 1980

[51] Int. Cl.³ .............................................. C05F 11/08
[52] U.S. Cl. ................................................ 71/5; 71/9; 71/901; 71/904; 47/1.1
[58] Field of Search ................... 71/1, 5, 8, 9, 11, 23, 71/24, 27, 64 G, 64 SC, 64 JC, 901, 903, 904; 47/9, 1.1

[56] References Cited

U.S. PATENT DOCUMENTS

| | | | |
|---|---|---|---|
| 1,733,745 | 10/1929 | Martin et al. | 71/8 |
| 1,832,593 | 11/1931 | Szücs | |
| 2,337,686 | 12/1943 | Sherman | 71/9 |
| 3,286,399 | 11/1966 | Laniece | 47/1.1 |
| 3,353,498 | 11/1967 | Sroda | 71/23 |
| 4,127,965 | 12/1978 | Mee | 47/1.1 |

OTHER PUBLICATIONS

Mushroom Mycelium Production by Submerged Propagation, Humfeld et al., Food Technology, 1949, vol. 3, No. 11, pp. 355-356.
Mushroom Mycelium, Experiments . . . Culture, Block et al., Agric. & Food Chem., pp. 890-893.

*Primary Examiner*—S. Leon Bashore, Jr.
*Assistant Examiner*—Ferris H. Lander
*Attorney, Agent, or Firm*—M. Howard Silverstein; David G. McConnell; Margaret A. Connor

[57] ABSTRACT

A cellulosic medium for growing mushrooms is disclosed. A liquid mixture containing sources of soluble carbon and nitrogen is fermented and mixed with cellulosic material. The so-treated cellulosic material is held at a temperature and for a time sufficient to allow substantial reduction of organisms damaging to mushroom culture. The cellulosic material then is cooled to a temperature suitable for spawning.

17 Claims, No Drawings 4,333,757

MUSHROOM-GROWING MEDIUM

BACKGROUND OF THE INVENTION

1. Field of the Invention

This invention is related to and has among its objects the provision of novel mushroom-growing media and novel methods of making the same. It is a particular object of the invention to provide media or compost for growing mushrooms that is ready for spawning within one day from the start of its preparation. Further objects of the invention will be evident from the following description wherein parts and percentages are by weight unless otherwise specified.

2. Description of the Prior Art

In the commercial production of mushrooms compost material usually is employed as a medium for growth. After formation of the compost, it is treated so that the microoganisms present are stimulated to make the compost suitable for the growth of mushrooms. Classically, composting material, e.g., horse manure, straw, or other suitable substitute, is assemnbled into piles and wetted. It is also a general practice to incorporate supplements such as nitrogen sources, minerals, and vitamins into the cellulosic compost. Then, the mixture is turned to aerate it three to four times during the next 7 to 10 days. During the entire process rapid, aerobic, thermophilic, microbial activity occurs and the temperature of the compost rises to about 55° to 80° C.

After initial composting is completed, the compost material is formed into beds in an enclosed space, usually indoors, and is allowed to ferment for another day or two. Then, steam and ventilation are introduced into the cellulosic material to raise the ambient temperature to about 60°–70° C. for about 6 hours. The temperature is allowed to fall to about 52° C. over the next 5 to 9 days. After further cooling, the compost is ready to be spawned with either solid or liquid spawn of the variety of mushroom to be cultivated.

Control of the aforementioned compost preparation is difficult and often oxygen is consumed so rapdily that anerobic metabolism occurs. Metabolites manufactured during anaerobic growth are detrimental to mushroom growth and must be avoided.

A summary of conventional approaches to compost preparation is found in "Composting" by W. A. Hayes, published by W. S. Maney and Son, Ltd., Leeds, England (1977).

Submerged propagation has been suggested for the production of liquid mushroom mycelium spawn (Humfeld et al., *Food Technology*, 1949, Vol. 3, No. 11, pages 355–356; Block et al., *Agricultural And Food Chemistry*, 1953, Vol. 1, No. 14, pages 890–893; Szuecs, U.S. Pat. No. 2,505,811; and Laniece et al., U.S. Pat. No. 3,286,399). In submerged culture of liquid mushroom mycelium spawn, a liquid medium is prepared from, for example, asparagusbutt juice, pear-waste juice, grain extract such as rice bran extract, synthetic media containing suitable carbohydrates, nitorgen sources, and inorganic salts, and so forth. The liquid medium is sterilized and inoculated with previously prepared growing mycelium culture. The mixture is fermented for about 4 to 7 days during which time mycelium growth is substantially completed. The so-prepared liquid medium is used to "spawn" solid compost material prepared for growing mushrooms.

The known method of mushroom production using a solid compost material is time-consuming because it requires at least two weeks to prepare the solid compost for spawning.

In U.S. Pat. No. 4,127,965, Mee discloses composting compositions which avoid conventional composting for production of mushrooms requiring casing. Cold manure is combined with a naturally occurring humic acid containing colloidal material and a small amount of inorganic material to enhance permeability. Upon addition of water to and pasteurization of this combination, it is found that the nitrogen content of the composition is substantially maintained and there is a substantial absence of free ammonia. The composting is inoculated then with spawn and incubated, and a casing is applied to the composting. The procedure for growing and harvesting mushrooms is conventional.

SUMMARY OF THE INVENTION

The invention described herein provides means for obviating the above-described problems. In accordance with the process of the invention, a fermented liquid mixture containing sufficient quantities of soluble carbon sources, and nitrogen and mineral sources to support microbial growth is prepared. Then, the liquid mixture is contacted with cellulosic material. The so-treated cellulosic material is held at a temperature and for a time sufficient to allow substantial reduction of organisms damaging to mushroom culture. The cellulosic material then is cooled to a temperature suitable for spawning.

The primary advantage of the process of the invention is the substantial decrease in the amount of time required to prepare solid compost for spawning. In the prior methods, about two to three weeks are necessary to obtain cellulosic compost capable of being spawned. As a result of the process of the invention spawnable compost can be prepared in 24 hours or less after contact with the fermented liquid mixture. Thus, a 90% or more savings in time is realized.

Another advantage of the invention is the conservation of energy in carrying out the instant process. In addition, the requirements for carbohydrate and nitrogen sources are reduced. Nitrogen promotes the metabolic loss of organic matter, which in turn spares energy used in the second phase of my method, namely, the partial fermentation of the cellulosic material.

Still another advantage of the process of the invention is that a substantial reduction in space required to carry out the composting process is realized. No cellulosic materials are involved until the second phase of my process. Since the liquid medium is much denser than wet cellulosic material and fermentation is done with a concentrated material, spatial requirements are smaller than in conventional compost preparation. Space is also saved by the slight amount of shrinkage or loss of organic matter by the cellulosic material.

A particular advantage of the invention is the greater ability to control the composting process. The first step in my method is similar to an ordinary aerobic industrial fermentation. As a result this step may be controlled and manipulated as in standard fermentations. For example, aeration, agitation, control of pH, and continuous operation, among others, may be controlled as in conventional fermentation practice. Furthermore, pasteurization is more adequate because there is liquid contact with all parts of the cellulosic material wetted in my process. Greater control of the composting process also results in avoidance of anaerobic conditions, which, as explained above, are detrimental to mushroom growth.

Another advantage of the invention is that greater yields of celulosic "compost" material are obtained. The short period required for preparing the cellulosic material for spawning leads to less decomposition of the material, and, thus, the solid compost will contain less silica, minerals, and microbial lignin.

DESCRIPTION OF THE PREFERRED EMBODIMENTS

In the first step of the process of the invention a liquid mixture containing a source of soluble carbon, nitrogen, and minerals necessary for microbial growth is prepared. As the source of soluble carbon one may use, by way of illustration and not limitation, carbohydrates such as glucose, galactose, mannose, fructose, maltose, xylose, arabinose, dextrin, mannitol, sucrose, starch, sorbitol, lactose, rhamnose, etc., as well as natural sources of carbohydrates such as the hot water extract of straw, molasses, grain, potatoes, fruits, whey, etc., and their byproducts, fats and oils such as vegetable oils, animal fats, etc., proteinaceous materials such as whey, blood meal, oil seed meals, alfalfa, brewer's byproducts, distiller's byproducts, and the like.

As the nitrogen source one may employ alfalfa press juice, monsodium glutamate, peptone, amino acids, urea, ammonium hydroxide, proteins, chicken manure, ammonium sulfate, ammonium phosphate, ammonium nitrate, calcium nitrate, and the like.

Minerals to be added include, for example, salts of calcium, phosphorus, sulphur, magnesium, potassium, iron, zinc, manganese, etc.

It should be noted, in general, that any liquid medium suitable for use in submerged cultivation of mushroom mycelium spawn may be employed in the initial step of my process provided it is prepared in accordance with my teaching.

The aforementioned liquid mixture is next heated with aeration at a temperature and for a period of time sufficient to ferment it, i.e., to metabolize substantially all of the organic nutrients. Good results are achieved if the mixture is heated at a temperature of about 40°–65° C. for a period of about 0.5–7 days, preferably at a temperature of about 50°–60° C. for about 20–40 hours. During this fermentation the pH of the mixture should drop slowly to about 4.0–6.0, preferably 4.5. To achieve this drop the mixture should contain a particular ratio of nitrogen source to soluble carbon source, namely, 11–13 parts of nitrogen source per 100 parts of soluble carbon source.

Prior to fermentation of the liquid mixture it is desirable to add a small portion of fermented material (inoculum) thereto in the proportion of 0.01–0.5 parts of fermented material per part of liquid mixture. As the fermented material one may employ pure cultures of organisms associated with mushroom culture, horse manure, compost prepared according to conventional techniques, fermented straw from a batch previously prepared in accordance with the teachings contained herein, or previously fermented liquid.

It is desirable to aerate the liquid mixture during the above fermentation. To this end air may be introduced into the liquid mixture in a know fashion, such as by bubbling air therethrough or the like.

Following the fermentation, the liquid mixture is mixed with an amount of water sufficient to reduce the nitrogen content of the mixture to about 0.1–0.5%, preferably 0.3%, based on the weight of the mixture and calculated from the initial content of nitrogen in the added source thereof. Next, a source of calcium ions, such as calcium sulfate, calcium carbonate, calcium bicarbonate, or ground gypsum is added to the liquid in the proportion of about 0.005–0.08 parts of calcium ions per part of cellulosic material to be treated.

Next, the temperature of the liquid mixture is raised to about 65°–80° C. The hot fermented liquid is contacted with dry cellulosic material in the proportion of approximately 3–10 parts of liquid per 1 part of cellulosic material. It is sufficient for purposes of the invention to pour the fermented liquid medium over the cellulosic material and allow excess liquid to drain off as long as the cellulosic material is wetted thoroughly. The cellulosic material can be soaked in the liquid. The so-treated straw then has a moisture content of about 65–85%, based on the weight of cellulosic material. It should be noted that excess liquid may be refermented and used in subsequent preparation.

As the cellulosic material one may employ any material conventionally used in preparing a solid compost for growing mushrooms. These materials are generally characterized as containing cellulose, hemicellulose, and lignin among others. The following materials are exemplary of those that may be used in the process of the invention: animal manure, cereal straw, vegetative wastes, and so forth, and combinations thereof.

The moistened cellulosic material should have a pH of about 6.5–7.5; if not the pH should be adjusted to within the above range by addition of appropriate amounts of acid or alkali. The moistened material is held for a period of time sufficient to allow a substantial reduction (greater than 80%) of organisms detrimental to mushroom culture, such as nematodes, insects, etc. Thus, the wetted material may be held at an elevated temperature for a short period of time and then cooled, or it may be cooled slowly over a longer period of time to achieve the aforementioned partial fermentation and to make it ready for spawning. The moistned cellulosic material may be held at a temperature of about 55°–75° C. for a period of about 1-18 hours, e.g., a temperature of about 65°–75° C. for a period of 1–4 hours and then cooled to ambient temperature. Lower temperatures such as 55°–65° C. and longer holding times such as 4–18 hours may be employed, if desired. Alternatively, the moistened straw may be cooled slowly to ambient temperature over a period of about 6–36 hours. By contact with the hot fermented liquid the cellulosic material becomes partially pasteurized and softened. It is to be noted that compost material can be made ready for spawning in 24–36 hours or less by the present process. Conventional composting procedures require at least two weeks to prepare a substrate that may be spawned.

It is within the compass of the invention to adjust the nitrogen content of the fermented liquid medium if the nitrogen content of the dry cellulosic material is less than 0.5%. To this end, the nitrogen content of the fermented liquid may be raised approximately 0.25% for each 0.1% that the nitrogen content of the dry cellulosic material is below 0.5%.

To determine whether a sufficient portion of the cellulosic material is ready for spawning one may employ pilot trials in accordance with the above-described procedure. Thus, partially fermented cellulosic material may be prepared in accordance with the invention, and a small portion of this material can be spawned to ascertain whether or not it supports mushroom growth. Generally, the cellulosic material prepared in accordance with my process will be ready for spawning within the aforementioned time period.

The novel compost material of the invention may be used to grow mushrooms that are normally grown on compost. The invention is suited particularly for, although not limited to, production of mushrooms of the genus Agaricus, including *Agaricus bisporus, Agaricus bitorquis, Agaricus brunnescens,* etc.

It is important to note that it is conventional in the known methods of preparing compost for growing mushrooms to add nutrients to the compost prior to fermenting it. However, compost with added nutrients still requires the conventional preparation time (two to three weeks) to place it in a condition for spawning. In my process, the cellulosic compost material is readied for spawning in 24–36 hours or less.

EXAMPLE

The invention is demonstrated further by the following illustrative example.

A mixture containing 18.5 l. of water, 500 ml of beet molasses, 100 g of cottonseed meal, 90 g of urea, 66 g of ammonium monohydrogen phosphate, and 126 g of calcium dihydrogen phosphate monohydrate was placed in a fermentor without any sterilization of the mixture. The temperature of the mixture was raised to and held at 59° C. The fermentor was inoculated with 1 kg of fermented straw and liquid from a previously prepared batch. The contents of the fermentor were stirred slowly, and air was bubbled therethrough at a rate of about 15 L./min. The pH fell slowly to 4.5 over a 24 hour period. The liquid mixture now had a volume of 17 l.

Nine liters of the so-prepared liquid mixture was diluted to 17 l. by addition thereto of 8 l. of water, and 100 g of gypsum was added to the mixture. The temperature of the diluted liquid was raised to 70° C., and the hot liquid was poured over 2 kg of rice straw to wet it thoroughly. Excess liquid, i.e., liquid not adhering to the surface of or absorbed on the straw, was allowed to drain off. The wetted straw had a moisture content of 75% and a pH of 6.5. This straw was packed in a bussing tray and allowed to cool slowly for 24 hours to ambient temperature.

The fermented straw was spawned with 100 g of *Agaricus bisporus* (Stoller Laboratories, Santa Cruz, Calif.) and cased in a conventional manner, and mushroom growth was allowed to take place. After 4 weeks mushrooms were harvested in the usual manner. The yield of mushrooms from one spawning was comparable to that obtained using conventional compost prepared from straw.

Having thus described my invention, I claim:

1. A process for preparing a cellulosic medium for growing mushrooms, which comprises the steps of
    (a) fermenting a liquid mixture containing sources of soluble carbon and nitrogen under aerobic conditions, the ratio of the nitrogen source to the carbon source being 11–13 parts of nitrogen source per 100 parts of soluble carbon source such as to result in a drop in pH of the mixture to about 4.0–6.0 during the fermentation,
    (b) mixing the fermented liquid mixture with an amount of water sufficient to reduce the nitrogen content of the mixture to about 0.1–0.5% based on the weight of the mixture and calculated from the initial content of nitrogen in the added source thereof,
    (c) incorporating into the fermented liquid mixture a source of calcium ions in the proportion of about 0.005–0.08 parts by weight of calcium ions per part by weight of cellulosic material,
    (d) heating the fermented liquid mixture to a temperature of about 65°–80° C.,
    (e) contacting the fermented liquid mixture with cellulosic material, and
    (f) holding the cellulosic material at a pH of about 6.5–7.5 and at a temperature and for a time sufficient to allow substantial reduction of organisms detrimental to mushroom culture.

2. The process of claim 1 wherein the liquid mixture is fermented at a temperature of about 40°–65° C.

3. The process of claim 1 wherein the liquid mixture is fermented for a period of about 0.5–7 days.

4. The process of claim 1 wherein the liquid mixture is fermented at a temperature of about 50°–60° C. for a period of about 20–40 hours.

5. The process of claim 1 wherein the liquid mixture is inoculated with a fermented material prior to fermentation of the liquid mixture.

6. The process of claim 5 wherein the liquid mixture is inoculated with a fermented material in the proportion of 0.01–0.5 parts of fermented material per one part of liquid mixture.

7. The process of claim 5 wherein the fermented material is fermented cellulosic material.

8. The process of claim 7 wherein the fermented material is from a previous batch prepared as in claim 1.

9. The process of claim 1 wherein cellulosic material contacted with fermented liquid mixture is heated at a temperature of about 55°–75° C. for a period of about 1–18 hours.

10. The process of claim 1 wherein cellulosic material contacted with fermented liquid mixture is cooled to ambient temperature over a period of about 6–36 hours.

11. The process of claim 1 which further includes the step of cooling the cellulosic material to a temperature suitable for spawning of the cellulosic material.

12. The process of claim 1 wherein the cellulosic material is straw.

13. The process of claim 1 wherein the fermented liquid mixture and the cellulosic material are contacted in the proportion of 3–10 parts of fermented liquid mixture per part of cellulosic material.

14. The process of claim 1 wherein the pH is allowed to drop slowly to 4.5.

15. The process of claim 1 wherein the nitrogen content of the liquid mixture is reduced to 0.3%.

16. The process of claim 1 wherein the pH of the cellulosic material is adjusted to within the range of about 6.5–7.5 prior to step f.

17. A cellulosic material for growing mushrooms prepared by the process of claim 1.

* * * * *

UNITED STATES PATENT AND TRADEMARK OFFICE
CERTIFICATE OF CORRECTION

PATENT NO. : 4,333,757
DATED : June 8, 1982
INVENTOR(S) : Ralph H. Kurtzman, Jr.

It is certified that error appears in the above—identified patent and that said Letters Patent is hereby corrected as shown below:

Column 4, line 18, after "65-85%" insert --preferably 75-80% --.

Signed and Sealed this

Fourteenth Day of September 1982

[SEAL]

*Attest:*

*Attesting Officer*

GERALD J. MOSSINGHOFF
*Commissioner of Patents and Trademarks*